United States Patent
Ort et al.

[11] 3,649,909
[45] Mar. 14, 1972

[54] WIDE BAND PHASE LOCK SPECTRAL PURITY MEASURING APPARATUS

[72] Inventors: Eldon L. Ort, Bucks City; John K. Smith, Philadelphia; John A. Kacergis, Bucks City, all of Pa.

[73] Assignee: The United States of America as represented by the Secretary of the Navy

[22] Filed: July 8, 1970

[21] Appl. No.: 53,047

[52] U.S. Cl. .................................. 324/77 E, 324/79, 324/82
[51] Int. Cl. .................................. G01n 23/16, G01n 27/02
[58] Field of Search .................................. 324/77, 79, 82, 83

[56] References Cited

UNITED STATES PATENTS

| | | | |
|---|---|---|---|
| 3,154,741 | 10/1954 | Attwood | 324/83 UX |
| 3,059,187 | 10/1962 | Jaffe | 324/79 UX |
| 2,888,643 | 5/1959 | Summerhayes, Jr. | 324/82 |
| 3,215,934 | 11/1965 | Sallen | 324/77 |

Primary Examiner—Edward E. Kubasiewicz
Attorney—R. S. Sciascia and Henry Hansen

[57] ABSTRACT

For phase locked measurements of spectral purity of radar transmitters, a comb generator provides harmonics of a crystal oscillator output signal which are applied through a phase shifter and a variable filter to furnish a reference frequency. The transmitter output signal is combined with the reference frequency in a mixer whose IF output is applied to a phase detector along with the output signal of a voltage-controlled oscillator. After rough adjustment of the oscillator, the phase detector output is fed back through a DC amplifier and low pass filter to the control input of the oscillator to maintain quadrature phase lock allowing FM sideband detection. The phase detector output may be passed to a wave analyzer and recording means or passed through a set of tuned bandpass filters and respective threshold detectors arranged to drive indicator means.

10 Claims, 2 Drawing Figures

WIDE BAND PHASE LOCK SPECTRAL PURITY MEASURING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention pertains generally to the field of frequency measurement devices and in particular to test equipment for analysis of spurious FM sidebands.

In a pulsed or CW doppler radar system, the frequency difference between the transmitted signal and the returned echo is related to the transmitting frequency and the relative speed of the reflective target object. For relatively slow moving targets, the echo will be returned at a frequency very close to the transmitting frequency. Doppler radar transmitters, therefore, must have a good spectral purity, ideally emitting a single, sharply defined frequency. If FM sideband noise close to the nominal transmitting frequency is present, the spurious spectral lines may appear in the echo signal as false moving targets. Moreover, a dense spurious spectrum may mask real targets and degrad the reliability of detection.

SUMMARY OF THE INVENTION

Accordingly, one of the objects of the invention is to measure and provide means for indicating the spectral purity and short term frequency stability of doppler radar transmitters. Another object of the invention is to provide a quantitative description of the spurious sidebands to furnish information useful to systems analysis problems, such as determining the sensitivity limitations of radar systems for doppler target detection. A further object of the invention is to detect FM noise with greater sensitivity close to the carrier frequency. Still another object of the invention is to provide a technique of wave analysis enabling measurements in narrower bandwidths with greater selectivity than formerly possible with common spectrum analyzers. Another object of the invention is to use a selectable pure frequency reference and to maintain phase lock with the carrier signal regardless of drift.

These and other objects of the invention are achieved by using a comb generator to provide harmonics of a crystal oscillator output which are applied through a phase shifter and a filter to a mixer receiving the attenuated output signal of the transmitter to be tested. The mixer IF output signal is applied to a phase detector along with the output of a voltage-controlled oscillator. The phase detector output is fed back after rough adjustment of the oscillator via a DC amplifier and low-pass filter to the control input of the oscillator. The phase detector output is passed to a wave analyzer and recording apparatus. In place of the wave analyzer, an automatic selectable bandwidth monitoring system may be provided by a plurality of bandpass filters tuned to successive bandwidths containing doppler frequencies of interest. The filter outputs may be passed to respective threshold level devices arranged to drive indicator means.

DESCRIPTION OF THE PREFERRED EMBODIMENTS

Figure 1:
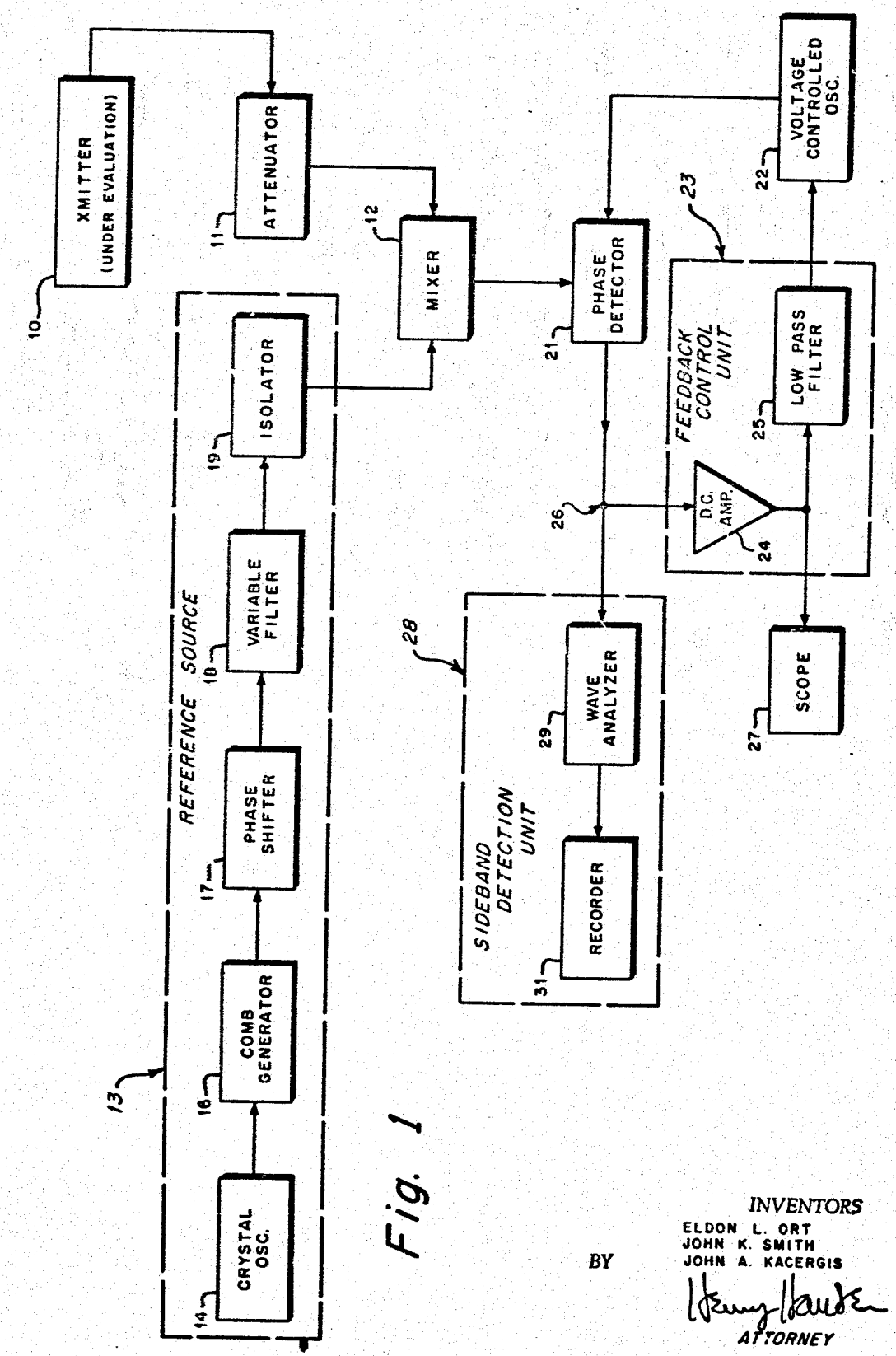
FIG. 1 is a block diagram of spectral purity measuring apparatus according to the invention.

Referring to FIG. 1, the output of a transmitter 10 whose source 13 purity is to be measured is passed via an attenuator 11 to one input of a mixer 12. The other input to mixer 12 is from a reference 13 comprising a crystal oscillator 14 whose single frequency output of known spectral purity is fed to a comb generator 16 producing a frequency spectrum consisting of multiples of the crystal oscillator frequency. Generator 16 may comprise a coaxial, microwave, step recovery diode module whose multiple output signals are at a frequency approximately equal to the input frequency. The output of comb generator 16 is passed to a phase shifter 17 to maximize the power at the output of mixer 12. At microwave frequencies shifter 17 comprises suitable means for matching the effective line lengths of generator 16 and filter 18. The reference frequency is selected from the output of generator 16 by a variable bandpass filter 18. The single frequency output of filter 18 is passed to the other input of mixer 12 via an isolator 19. Mixer 12 then combines the two input signals to produce an IF signal. A Shottky barrier diode is preferably used for mixer 12 instead of a point contact diode since the latter type exhibits 1/f. noise creating severe deterioration for low IF output frequencies.

The IF output of mixer 12 is passed to a phase detector 21, a suitable example of which is a Shottky barrier diode phase detector. Phase detector 21 operates like a mixer beating the input frequencies together, but its output contains an essentially DC component related to the phase difference of the two input signals. This DC component changes from a slowly varying signal to a steady or nulled signal when the input signals are in quadrature, that is, 90° out of phase with each other. Those skilled in the art will recognize that the output of phase detector 21 will contain FM sidebands with no AM noise only when the input signals are maintained in quadrature. The other input of phase detector 21 is connected to the output of a voltage-controlled oscillator 22 preferably capable of manual as well as closed loop control.

A feedback loop from the output of phase detector 21 to the control input of oscillator 22 comprises a feedback control unit 23 having a DC amplifier 24 whose output is passed through a low-pass filter 25 to provide a control voltage input to oscillator 22. Amplifier 24 may be a conventional amplifier designed to pass DC as well as AC signals. A suitable amplifier circuit would, for example, have a direct-coupled input stage, variable gain and some means of varying the output level. Low-pass filter 25 may be of the conventional RC type grounding out AC signals above, for example, 30 Hz. so that the control input of oscillator 22 will follow only relatively slow changes in the DC level representing phase shifts between the inputs to phase detector 21.

The unfiltered output of amplifier 24 is connected to an oscilloscope 27 to monitor the output of phase detector 21. When the inputs to phase detector 21 are not in quadrature, the output of amplifier 24 will appear as a low frequency sine wave. When the inputs are in quadrature a straight line is approximated indicating the null condition.

The output of phase detector 21 is passed via junction 26 to a sideband detection unit 28 including a wave analyzer 29 which sweeps the output bandwidth of phase detector 21 with a narrow band-pass filter having a window of, for example, 10 Hz. bandwidth. The rate at which the window is moved depends on the bandwidth of the window, smaller bandwidths requiring slower movement. The output of wave analyzer 29 is passed to a recording device 31 which indicates the power level of the FM sidebands. The slower the sweep, the more detailed the account of FM sideband power. The recorded output may be calibrated in db. relative to the known power level of the carrier signal. If desired, an additional DC null meter may be connected to the phase detector output at junction 26. Like oscilloscope 27 its nulled reading indicates quadrature.

Figure 2:
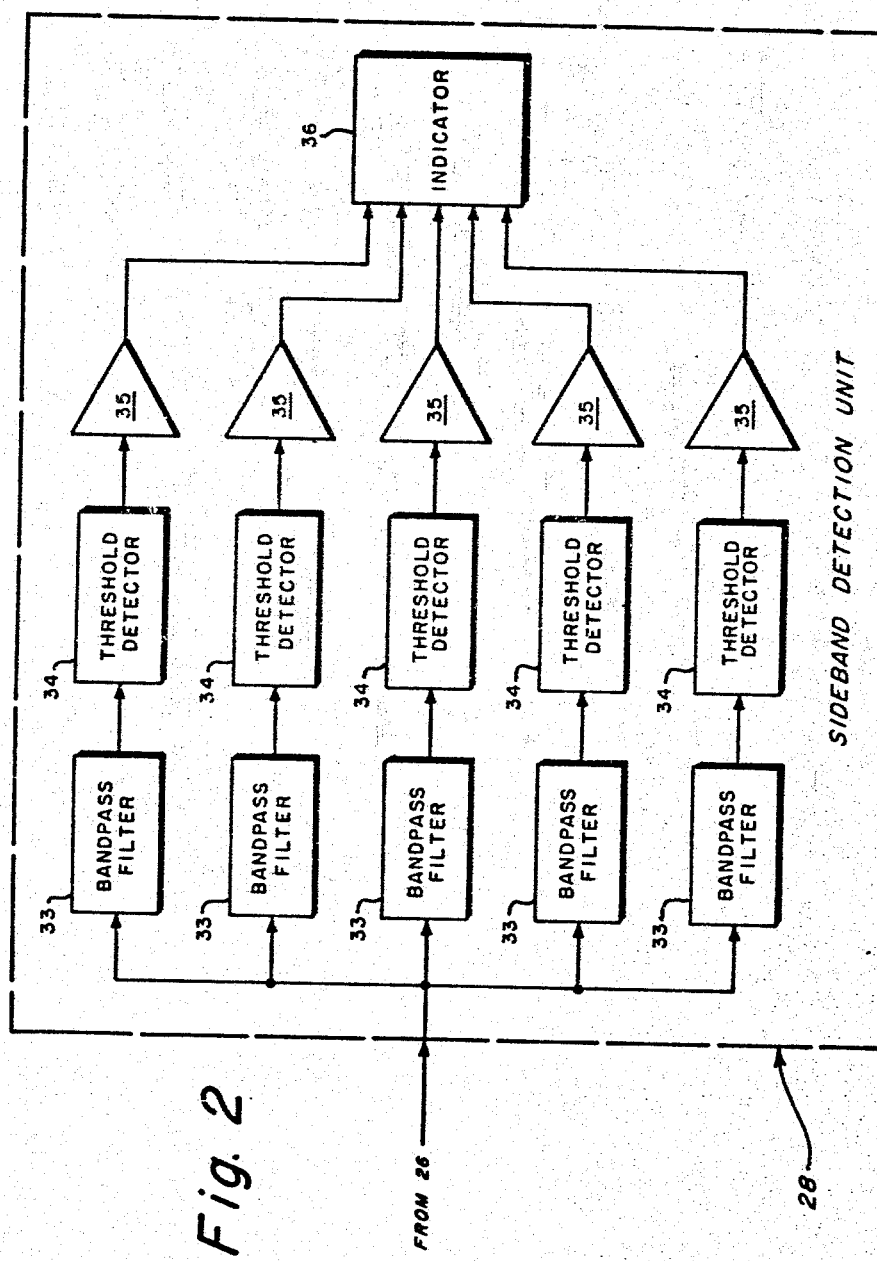
FIG. 2 is a block diagram of another embodiment of the sideband detection unit of FIG. 1.

Referring now to FIG. 2, the readout portion of an operational test set is depicted for repeated use with transmitters of specified frequencies. To enable untrained personnel to check the spectral purity of an in-use doppler radar transmitter, the wave analyzer 29 and recorder 31 of sideband detection unit 28 are replaced by a plurality of band-pass filters 33 fed in parallel by the output of phase detector 21. Filters 33 can be set to pass chosen frequencies that are of interest for evaluation because they lie in the doppler range, or a completely tunable filter channel can be used to investigate the broadband spectrum. The outputs of filters 33 are passed to respective threshold detectors 34 which produce outputs only when specific signal thresholds have been exceeded. The outputs of threshold detectors 34 are next passed via respective amplifiers 35 to an indicator 36 which may comprise a plurality of GO-NO GO lights, meters or an oscilloscope having selectable inputs corresponding to each band-pass filter 33. The passbands for filters 33 may be chosen in accordance with the doppler frequency range of interest. For example, filters 33 may cover a continuous, successive range of frequencies. One of the filters 33 may be a selectable filter having a constant passband width which may be swept over the frequency range of interest.

In operation, assuming a CW transmitter 10 operating at the X-band frequency of 9.68 gHz., the proper reference source frequency should be chosen so that the mixer 12 output frequency is in the range available from oscillator 22. If crystal oscillator 14 has a 100 MHz output the appropriate microwave signal is selected by adjusting variable filter 18 to pass the 97th harmonic signal produced by comb generator 16. The output of the reference source will thus be 9.7 gHz. which when mixed with the attenuated transmitter 10 frequency of 9.68 gHz. will produce an IF signal output from mixer 12 of 20 MHz assumed here to be well within the bandwidth of oscillator 22.

Once the appropriate IF replica of the transmitter signal has been obtained, oscillator 22 should be manually adjusted so that its output is approximately at the same frequency as the IF. During this initial rough tuning, the feedback loop is open, that is, the frequency is not closed loop controlled. Oscilloscope 27, displaying the amplified output of phase detector 21, can be used to identify the null condition when oscillator 22 is slewed to a position close to the carrier frequency in the IF signal. This preliminary procedure is necessary due to the relatively narrow bandwidth response of the control input to oscillator 22 because of low-pass filter 25. Slow DC changes will be followed, but relatively high frequencies in the phase detector 21 output will be ignored by oscillator 22. Thus, phase lock is not possible unless oscillator 22 is first brought into rough agreement with the IF input. Once approximate nulling is observed, the feedback loop may be closed allowing servocontrol of the output of oscillator 22.

By adjusting the output level of amplifier 24, phase lock can be verified. If the input frequencies to phase detector 21 are not close enough, varying the amplified feedback signal will have little effect. If, however, the signals are approximately at the same frequency, initial nulling can be obtained with the feedback loop closed by adjusting the output level of amplifier 24. With the inputs to phase detector 21 in quadrature, the detector output will contain FM sideband signals which can be measured by wave analyzer 28.

The operational test set functions in a similar manner except for the readout portion of FIG. 2. If the test set is to be used repeatedly to test the same nominal transmitter frequency, oscillator 22 may be preadjusted so that it will be in the range for positive phase lock, thus eliminating initial, open-loop adjustments. Band-pass filters 33 may be set to known doppler ranges. If GO-NO GO lights are used, a NO GO light for a specific filtered band would indicate that the transmitter itself was contributing unacceptable, false doppler spectra which might disqualify the transmitter for use in the doppler radar.

Numerous advantages are achieved by the present invention. The apparatus of FIG. 1 provides means for relating FM sideband power to carrier power for gauging the spectral purity of signal sources. By using the frequency-sweeping wave analyzer 29 and recorder 31, a catalog of spectral content can be generated. The phase lock feedback loop makes continuous manual frequency adjustment due to drift unnecessary and enables operation by untrained personnel. Reference source 13 provides a wide-band capability. By changing the bandwidth of filter 17, frequencies from the VHF band through X-band (100 MHz to 12.4 gHz. using 100 MHz oscillator 14) are available for use with transmitters having corresponding frequencies. The system is thus by no means limited to the microwave region, although that region is of high interest in doppler applications. One central advantage of the invention is that the reference source need not be precisely at the same frequency as the equipment to be tested since an IF frequency is generated. Quadrature is accomplished at the IF level instead of the RF level, making the reference source far more versatile.

Another advantage lies in the relatively uncomplicated nature of the equipment. The test apparatus is comparatively inexpensive, lightweight and inherently stable in the aircraft environment. Moreover, the spectral purity measuring apparatus of the invention exhibits improved sensitivity and selectivity over prior art devices.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. Spectral purity measuring apparatus comprising:
   means for providing a predetermined fixed frequency;
   means adapted to receive said fixed frequency and an RF transmitter output for producing an IF replica output of said transmitter output;
   variable oscillator means for producing an output frequency whose phase is variable by means of a control signal input;
   phase detector means having a first input connected to receive the IF replica output and a second input connected to receive the variable oscillator means output for producing an output indicative of phase quadrature of said first and second phase detector means inputs;
   feedback means connected to receive phase detector means output for producing said control signal input to said variable oscillator means; and
   means connected to receive the phase detector means output for indicating the signal level thereof in a plurality of bandwidths.

2. Spectral purity apparatus comprising:
   means adapted to receive an RF transmitter output for producing an IF replica output thereof including a fixed frequency oscillator, means connected to receive the output of said fixed frequency oscillator for generating harmonics thereof, filter means connected to receive the output of said harmonic generating means for producing an output containing selected ones of said harmonics, mixer means having a first input adapted to operatively receive the RF transmitter output and a second input operatively connected to receive the filter means output for combining the signals at said first and second mixer means inputs to produce said IF replica output;
   variable oscillator means for producing an output frequency whose phase is variable by means of a control signal input;
   phase detector means having a first input connected to receive the IF replica output and a second input connected to receive the variable oscillator means output for producing an output indicative of phase quadrature of said first and second phase detector means inputs;
   feedback means connected to receive the phase detector means output for producing said control signal input to said variable oscillator means; and
   means connected to receive said phase detector means output for indicating the signal level thereof in a plurality of bandwidths.

3. Measuring apparatus according to claim 2 wherein:
   said means for indicating the signal level comprises a wave analyzer connected to receive said phase detector means output and producing an output representing the level of said phase detector means output as a function of frequency and recording means for indicating said wave analyzer output.

4. Measuring apparatus according to claim 2 wherein:

said signal level indicating means comprises a plurality of band-pass filters each connected to receive said phase detector means output for producing respective outputs indicating the signal level within each respective filtered band, a plurality of threshold detectors connected respectively to receive the outputs of said plurality of band-pass filters for providing respective output signals when the outputs of said band-pass filters exceed respective threshold levels and display mean operatively connected to receive the outputs of said plurality of threshold detectors for indicating the respective conditions of the threshold detector outputs.

5. Measuring apparatus according to claim 2 wherein:

said feedback means includes amplifying means connected to receive said phase detector means output and low-pass filter means connected to receive the output of said amplifying means for producing said control signal input to said variable oscillator means.

6. Measuring apparatus according to claim 5 further comprising:

means operatively connected to receive said phase detector means output for indicating whether said first and second inputs to said phase detector means are in phase quadrature.

7. Measuring apparatus according to claim 6 wherein:

said means for indicating phase quadrature comprises null detection means.

8. Apparatus for measuring the spectral content of a transmitter output, comprising:

a fixed frequency oscillator;

comb generator means connected to receive the output of said fixed frequency oscillator for producing harmonics thereof;

variable filter means operatively receiving the output of said comb generator means for selecting predetermined ones of said harmonics;

mixer means having a first input adapted to operatively receive the transmitter output and a second input operatively connected to receive the output of said variable filter means for combining the signals at said first and second inputs to produce an IF replica of said transmitter output;

phase detector means having first and second inputs for producing an output indicative of the phase difference between the signals at said first and second phase detector means inputs, said first input being connected to receive the mixer means output;

voltage controlled oscillator means for producing an output frequency whose phase is variable by means of a control signal input, said phase detector means second input being connected to receive the output of said voltage-controlled oscillator;

amplifying means connected to receive said phase detector means output;

filter means connected to receive the output of said amplifying means for providing said control signal input to said voltage-controlled oscillator;

a plurality of band-pass filters connected respectively to receive said phase detector means output; and a plurality of threshold detector means connected to receive the respective outputs of said band-pass filters for providing respective outputs indicating whether the levels within the filtered bands exceed respective thresholds, the output of said plurality of threshold detector means being adapted to be connected to display means for indicating the conditions of the respective threshold detector means outputs.

9. Apparatus according to claim 8 wherein:

said mixer means is a Shottky barrier diode.

10. Apparatus for measuring the spectral content of an external signal having a nominal carrier frequency, comprising:

fixed frequency oscillator means;

comb generator means connected to receive the output of the said fixer frequency oscillator for providing harmonics thereof;

variable filter means operatively connected to receive the output of said comb generator means for selecting predetermined ones of said harmonics;

mixer means having a first input operatively connected to receive the output of said variable filter means and a second input adapted to receive said external signal for combining the signals at said first and second inputs to produce an IF output frequency;

phase detector means having first and second inputs for producing an input indicative of the phase difference between the signals at said first and second inputs, said first input being connected to receive the output of said mixer means, said phase detector means output being adapted to be connected to display means for indicating the level of said phase detector means output in a plurality of discrete bandwidths;

voltage-controlled oscillator means for producing an output frequency whose phase is variable by means of a control signal input, said phase detector means second input being connected to receive the output of said voltage-controlled oscillator means;

amplifying means connected to receive said phase detector means output; and filter means connected to receive the output of said amplifying means for providing said control signal input to said voltage controlled oscillator means.

* * * * *